May 28, 1957 A. BECKER 2,793,855
FEEDING AND ALIGNING MECHANISM FOR AUTOGRAPHIC REGISTERS
Filed Jan. 18, 1954 4 Sheets-Sheet 1

INVENTOR.
Aloysius Becker.
BY
Wood, Herron & Evans.
ATTORNEYS.

May 28, 1957   A. BECKER   2,793,855
FEEDING AND ALIGNING MECHANISM FOR AUTOGRAPHIC REGISTERS
Filed Jan. 18, 1954   4 Sheets-Sheet 4

INVENTOR.
Aloysius Becker.
BY
Wood, Herron & Evans.
ATTORNEYS.

No. 2,793,855
Patented May 28, 1957

2,793,855
FEEDING AND ALIGNING MECHANISM FOR AUTOGRAPHIC REGISTERS

Aloysius Becker, Hamilton, Ohio, assignor to Paul Benninghofen and F. B. Diesbach, Hamilton, Ohio, trustees Application January 18, 1954, Serial No. 404,561

13 Claims. (Cl. 271—2.4)

This invention relates to autographic registers, and particularly to improvements in the feeding and aligning mechanism of autographic registers which are used for manifolding stationery. Such stationery consists of a plurality of superimposed continuous webs or strips which usually are sold as a packet in which the strips are folded in sig-zag fashion. The folds are made at transverse lines of perforations which define sets of blank forms within the packet, and which permit the forms to be torn apart readily. Each form within a set has a pair of spaced apertures therein which are aligned transversely at the head end thereof adjacent to the line of perforations. These apertures cooperate with the feeding and aligning mechanism of the register to insure that the superimposed forms of each set are delivered onto the writing platen of the register in accurate registry with respect to one another.

More specifically, the present invention is directed to improvements in the feeding and aligning mechanism of autographic registers of the type set forth which incorporate the feeding principle accredited to Shoup and Oliver, two outstanding inventors in the autographic register field. The Shoup and Oliver principle involves the use of an upper pressure roller and a pair of lower feed discs. The pressure roller has tread portions thereon which cooperate with the feed discs to feed and align the superimposed forms by virtue of their relationship to the apertures in the forms. The discs and roller are driven by means such as a crank which may be affixed to one end of the shaft carrying the feed discs. The roller is in positive driving connection with the discs, by means such as gears, and is mounted on a shaft which is spring urged downwardly to provide peripheral contact between the respective treads and discs. The superimposed forms are fed between the roller and the discs, the discs being disposed in alignment with the apertures in the forms. As a result, the forward motion of the superimposed forms automatically terminates when the apertures are advanced to a position in which they are disposed between the discs and treads of the roller. In this position the discs and treads come into rolling contact with one another through the respective apertures and thereafter during the crank cycle turn with respect to one another without having any effect upon the forms. This means that the mechanism can be used with forms of different length, which is the primary advantage of the Shoup and Oliver principle.

However, the principle of operation can be used for feeding only. Accurate, final registry of the superimposed forms is accomplished by aligning means, usually pins, which enter the apertures and pull the forms into alignment. In most instances in the past, the pins or other aligning means were mounted in fixed position upon the feed discs so that they came into effective position at the end of the rotation of the feed discs. In such constructions, the upper limit of the length of form which could be advanced during a revolution of the hand crank was dependent upon the length of the tread, e. g. the circumference, of the feed discs. At no time could a form be used which was longer than the circumference of the discs, and in order to use the Shoup and Oliver mechanism for long forms, the feed discs had to be enlarged to a point where their size was objectionable. From the point of view of commercial acceptance, a low silhouette register is preferred over a high one. The larger the feed discs, of course, the higher the register casing must be to enclose them. Having in mind the desirability of a low silhouette casing in a register adapted to handle long forms, it is one of the objectives of the present invention to provide autographic register feeding and aligning mechanism which incorporates the Shoup and Oliver principle in feeding and aligning discs which are arranged to rotate at least twice for each turn of the crank shaft. Thus, the circumference of the feed discs need be only one half that of the length of the forms to be handled, making it possible to incorporate them and the aligning means associated with them in a register which is of a more desirable size.

In order to make it possible to have the feed discs rotate at least twice for each turn of the crank shaft, means must be provided for decommissioning the aligning pins except at the time in the last portion of the crank cycle when they must move into aligning engagement with the apertures in the forms. In the preferred embodiment of the invention this is accomplished by novel aligning pin means which are mounted on the feed disc so as to rotate with them. The aligning pin means are spring urged to retract the aperture engaging portions thereof so that they are normally disposed radially inwardly of the peripheries of the discs. The aligning pin means are moved into aperture engaging positions by positive acting cam means which become effective only near the end of one complete cycle of operation. Thus, the feed discs may turn twice, or more times if desired, in order to feed long forms onto the writing platen without interference by the aligning pin means, the pins coming into play only at the completion of the desired number of revolutions of the feed discs.

Despite the many aligning and feeding mechanisms employing the Shoup and Oliver principle, it continues to be the objective of the inventors working in the field to simplify the mechanism and to make it more efficient. Therefore, additional objectives of the present invention are simplification and increased operating efficiency. Toward this end, the improved aligning means which are associated with the feed means are of simple and inexpensive construction and serve to bring the forms into absolute and accurate registry each time that the autographic register is operated.

In substance, the feeding means provided are effective to deliver forms which may vary in length from two or three inches to twelve inches or more. The feeding is accomplished, however, by feed discs which are of a size which permits them to be incorporated in a register of low silhouette. The aligning means provided to operate in conjunction with the feeding means are arranged so that they automatically move into aperture engaging positions only after the feed discs have been rotated sufficiently far to insure delivery of the longest forms.

Other objectives and advantages of the present invention will be obvious to those skilled in the art from the following detailed description of the drawings in which.

In the drawings, an autographic register casing is indicated generally at 10. In the instance shown a cover or lid portion 11 of the casing is formed in one piece as a casting of light metal such as aluminum. The cover has a rectangular window 12 in the top thereof to expose manifolding forms such as the one shown at 13. The forms are brought into registry upon a writing platen 14, being fed from a packet (not shown), which resides within the register casing beneath the writing platen. The strip of forms is threaded through an improved separator assembly at the right of the writing platen as it appears in Figure 2. The separator assembly is indicated generally by the numeral 15 and is disclosed in detail in copending patent application Serial No. 404,707, filed January 18, 1954.

Figure 1:
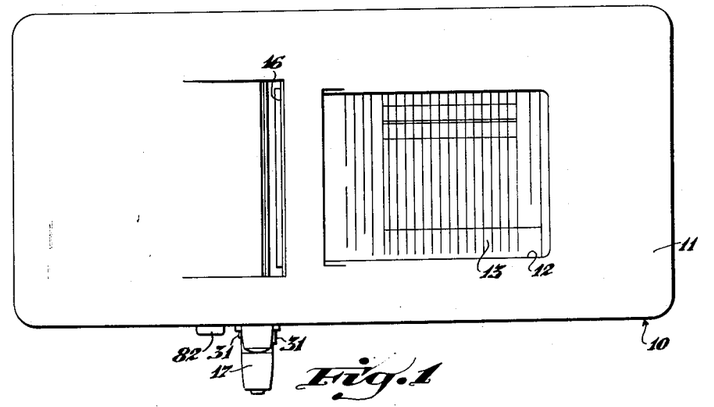
Figure 1 is a top plan view of an autographic register incorporating the feeding and aligning mechanism of the present invention.

The manifolding forms are withdrawn from the packet through the strip separators, across the writing platform, where they are interleaved with carbon paper, and delivered in registry with respect to one another on the writing platen by the feeding and aligning mechanism of the present invention. During the advancing operation, a set of forms is also discharged through a delivery slot 16 onto the top of the cover at the left, as illustrated in Figure 1, where they may be torn from the strip. At the same time, the lowermost one of the forms is delivered to a storage compartment which is beneath the cover at the left of the feeding and aligning mechanism as it appears in Figure 2.

The above described movement of the forms is conventional and is known to those skilled in the art. For this reason the parts of the register which concern the storage of the forms and their movement to and from the feeding and aligning mechanism will not be described in detail, it being obvious that the construction and arrangement of the parts of the feeding and aligning mechanism, which are the subject of the present invention, are adapted for use in autographic registers of the general type illustrated.

Although the strip separator assembly 15 contributes in a degree to the overall efficiency of the register shown, it will be seen that it is not critical to its operation and that conventional separators may be used in combination with the present feeding and aligning mechanism, if desired. It also will be appreciated that the present feeding and aligning mechanism may be powered by a cyclically operated electrical motor, if desired, instead of the hand crank indicated at 17. Space for such a motor is provided in the general area indicated by the numeral 18, which is on the right side of the storage compartment of the register.

The feeding and aligning mechanism of the present invention is mounted within the register between two chassis side plates which are indicated generally by the numeral 19. Each side plate includes a vertical wall portion 20, a foot flange 21, and an upright rib 22. The respective walls are disposed opposite to one another at the head end of the writing platen 14, the respective foot flanges rest upon and may be spot welded or otherwise fastened to the bottom of the lower portion 23 of the register housing. The two ribs 22 turn inwardly toward each other and are provided to rigidify the vertical portions 20 of the respective walls.

The two walls 20—20 journal four shafts: a drive shaft 24, to which the crank 17 is pinned at the left side of the register; a feed disc shaft 25, on which two feed disc assemblies 26—26 are journalled; an actuator shaft, 27, upon which two aligning pin actuator cams 28—28 are journalled; and, a cross shaft 29. The latter shaft serves as a hold-down means for urging a grip roller assembly 30 downwardly into feeding relationship with the feed discs 26—26.

The crank 17 is limited to a single, continuous cycle of operation by means of a pair of spring urged push pins 31—31 which extend from a side wall of the register casing to interlock with the crank handle. When the handle is locked against rotation between the respective pins, the push pin at the side of the handle in the direction which it is rotated during operation is exposed and is accessible to the operator. Depressing the latter pin releases the handle so that it may be turned for the cycle of operation. This type of stop or its equivalent is well known in the art and further illustration and description are believed to be unnecessary.

Figure 15:
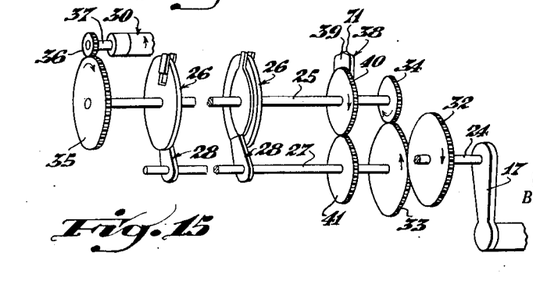
Figure 15 is a diagrammatic view, in perspective, showing the gear train from the crank to the pressure roller.

Reference is now made to the diagrammatic view of Figure 15 which illustrates the gear train from the crank handle to the grip roller assembly 30. In this view, crank 17 is at the right so that the feed direction of the manifolding forms is toward and to the right of the viewer. A portion only of the crank shaft 24 is shown and certain ones of the gears at the left of the view have been omitted for clarity. A gear 32 is keyed to shaft 24 and is in driving connection with a gear 33 keyed to the actuator shaft 27. Gears 32 and 33 are identical so that the driving ratio between shafts 24 and 27 is one to one. Thus, shaft 27 makes one revolution for each cycle of operation of crank 17. The feed disc shaft 25 is, however, geared so that it makes two revolutions for every turn of the crank handle. This is accomplished through a small gear 34 which is keyed on drive shaft 25 and which is in driving connection with the gear 33. The ratio between gear 33 and gear 34 is one to two. The feed disc assemblies 26—26 on the feed shaft 25 thus makes two revolutions for one revolution of crank 17. At the left end of drive shaft 25, as shown in Figure 15, a gear 35 is pinned which is in driving connection with the feed roll assembly 30 through a gear 36. The latter gear is pinned to a shaft 37 which journals the feed roll assembly 30. It will be further noted from the diagram that the pin actuator cams 28—28 make one revolution for each two revolutions of the feed disc assemblies. The reason for this will be explained in detail under the subheading "Operation" at a later point in the specification.

The diagram has one other element, this being a grip roller lift means which is indicated generally at 38. The lift means includes a cam 39 and a gear 40 which are journalled on shaft 25. The cam and gear are fastened to one another so that they rotate together. Gear 40 is in driving connection with a gear 41 which is pinned to the cam actuator shaft 27. The driving ratio between gears 40 and 41 is one to one, so that the cam and gear assembly 39—40 makes one revolution for each revolution of the crank 17. Inasmuch as shaft 25 turns at twice the speed of shaft 27, the cam gear assembly is merely journalled upon it, permitting shaft 25 to turn relative thereto. The reason for this arrangement is also explained in detail under the head "Operation."

*Construction details*

Figure 3:
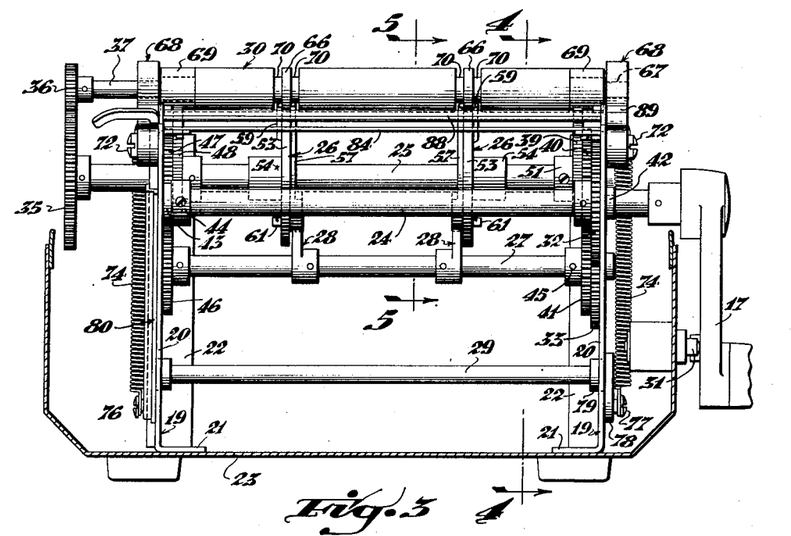
Figure 3 is a cross sectional view taken on the line 3—3 of Figure 2.

The journals for the respective shafts 24, 25 and 27 in the chassis side plates may be made by forming short bushings in the wall material at the journal openings. The shaft 29, may be journalled in apertures in the respective plates. The drive or crank shaft 24 extends across the register in front of or at the discharge side of the other parts of the assembly. As shown in Figure 3, the drive shaft adjacent the crank end thereof is journalled in a bushing 42 which is formed as an integral part of the chassis side plate, the bushing extending from the outside of the wall. The gear 32 is pinned to the drive shaft 24 just inwardly of this side wall. The opposite end of the shaft 24 is journalled within a bushing 43 which is turned inwardly, in this instance, from the side plate. A collar such as the one shown at 44 may be secured to the shaft adjacent to the bushing 43 in order to lock the shaft in place. Thus, the drive shaft 24 mounts only the one gear, which is indicated at 32.

The actuator shaft 27, by contrast, mounts three gears and is journalled in the respective chassis side plates in bushings similar to those shown at 42 and 43. At the crank end of the machine, the gear 33 (which meshes with gear 32) and the gear 41 are pinned or otherwise fastened together and are pinned to shaft 27 as at 45. It will be recalled from the diagram that the gear 41 at the crank end of the actuator shaft 27 is intermeshed with the gear 40 of the grip roller lift assembly 38, the gear 40 and cam 39 which constitute the assembly, being free to rotate on shaft 25. The same group of elements (not shown in the diagram) is duplicated at the opposite end of shaft 25, consisting of a gear 46 which is pinned to shaft 27, a gear 47 and a pressure roller lift cam 48. The latter two elements are free to turn with respect to shaft 25 and are secured together. The pin actuator cams 28—28 are also pinned to shaft 27 at spaced points intermediate the respective ends thereof.

Figure 8:
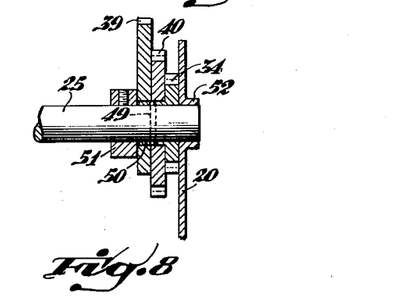
Figure 8 is a fragmentary cross sectional view illustrating the manner in which the gears at the crank end of the feed disc are mounted.
Figure 9:
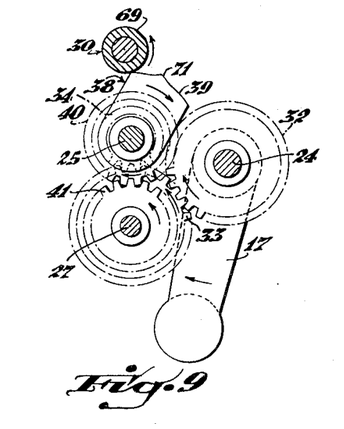
Figure 9 is a fragmentary view illustrating diagrammatically the gear train adjacent the crank, the position of the crank corresponding to the position of the feed disc illustrated in Figure 5.
Figure 10:
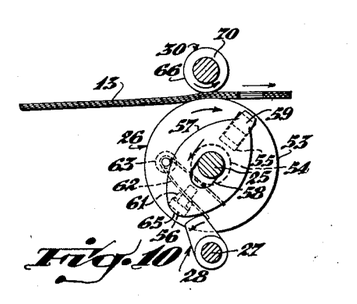
Figure 10 is a view similar to Figure 5 in which the feed disc is in a more advanced position.
Figures 11, 12:
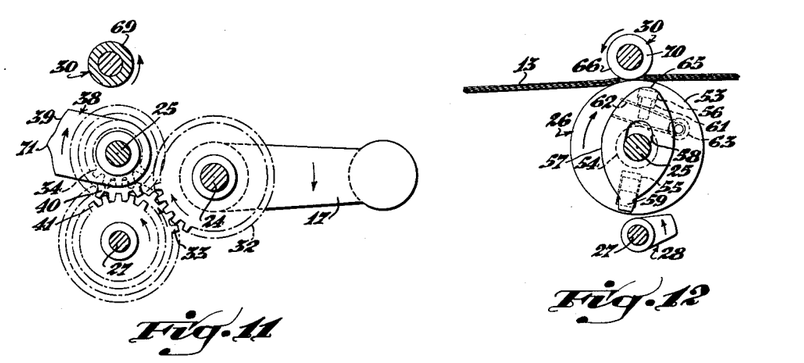
Figure 11 is a view similar to Figure 9 in which the crank is turned through substantially three-quarters of a revolution.
Figure 12 is a view similar to Figure 5 showing the positions of the various elements of the feed and aligning mechanism when the crank is in the position illustrated in Figure 11.

The fragmentary cross sectional view of Figure 8 illustrates the preferred construction and arrangement of the gear 34 which meshes with gear 33. This gear is keyed to the shaft 25 by means of a cross pin 49 which traverses a sleeve portion 50 of the gear 34, the sleeve extending from the inner face of gear 34. The gear 40 and the grip roller lift cam 39 are rotatably journalled on the sleeve portion 50 of gear 34, being maintained thereon by a collar 51 which is locked onto shaft 25 by means of a set screw.

Figure 5:
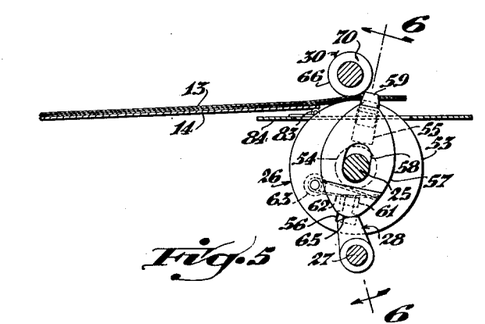
Figure 5 is a fragmentary cross sectional view, taken on the line 5—5 of Figure 3, showing the pressure roller and a feed disc in the positions which they assume at the start of an advancing operation.

The end of shaft 25 adjacent to crank 17 is journalled in a bushing 52 which is turned outwardly from the side plate 20. The opposite end of shaft 25 may be journalled in a similar bushing (not shown) in the opposite side plate. The shaft extends through the wall in this instance and at its terminal end mounts gear 35 which is pinned to it. As disclosed in the diagrammatic view, the gear 35 meshes with the gear 36 which drives the shaft 37 upon which the grip roller assembly is mounted. The feed disc assemblies 26—26 also are pinned to shaft 25 in spaced relationship intermediate the respective chassis side plates. Each feeder disc assembly includes a circular disc 53. At the center of the disc a sleeve 54 is provided to receive the shaft 25. In each assembly, the sleeve 54 is toward the outside of the disc, and may be formed as an integral part of the disc 53 or it may be brazed or otherwise secure thereto. The tread portion of each disc is plain and parallel with the central axis of the shaft 25. At points diametrically opposite to one another the disc has a rectangular radially disposed slot 55 cut therethrough and a T-shaped radially disposed slot 56 cut therethrough. In the latter instance, the head of the T-shaped slot is adjacent to the periphery or tread of the disc. The respective slots 55 and 56 are designed to receive and slidably support an aligning pin plate which is indicated at 57. In each instance, the plate is disposed at the inner side of the disc portions of the two feed and aligning disc assemblies. The plate 57 may be substantially elliptical, as shown in Figure 5. It has an elongated aperture or slot 58 at the center thereof through which the shaft 25 extends and which permits the plate to be moved diametrically of the disc 53 within the limits afforded by the ends of the slot. At the rectangular slot end of the elliptical plate 57, a split aligning pin 59 is provided. As seen from the top, the pin is substantially circular in outline with a deep groove 60, cutting diametrically across it. The split pin preferably also tapers inwardly and upwardly slightly as shown. The one-half of the pin extends through the rectangular slot 55 so that the outer marginal area of the disc 53, between the tread portion thereof and the outer edge of the slot 55, resides within the groove 60. At the opposite end of the plate 57, a T-shaped lug 61 thereon is engaged through the T-shaped slot 56, the head of the T-shaped lug engaging the outer face of the disc at the two sides of the shank portion of the slot 56. The elliptical plate is urged toward a centered position with relation to the disc 53, in which position the split aligning pin 59 is retracted with respect to the tread of the disc, by means of a hairpin spring 62. Spring 62 is journalled upon the shank of a large headed stud 63 which is secured to the outer face of the disc. One of the two arms of the hairpin spring is seated in a groove 64 formed at the inside of the head of the T-shaped lug 61. The other arm of the hairpin spring seats against the sleeve portion 54 of the disc. The purpose of the spring is to urge the aligning pin toward retracted position and thus it is at all times under tension.

The end of the elliptical plate opposite to the split pin 59 is rounded to provide a cam surface 65, which surface is adapted to be engaged by the cam surface of a pin actuator cam 28 for raising the pin into form registry position at the end of one cycle of operation of the crank 17. The final registry position of the pin actuator cams is illustrated in Figure 3. It is noted at this point, however, that inasmuch as shaft 27 rotates at one-half of the speed of shaft 25, the pin actuator cams engage the cam surface on the respective elliptical aligning pin plates only once in two revolutions of the discs 53; so that during the first revolution of the discs, the pins are in their retracted positions when they pass by the grip roller.

Figure 6:
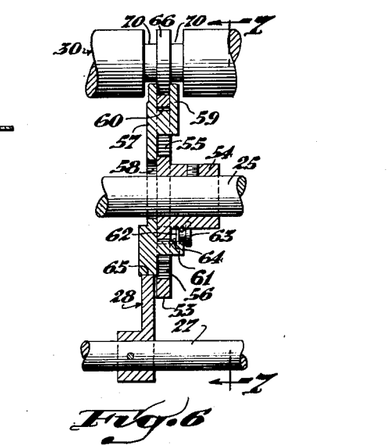
Figure 6 is a cross sectional view taken on the line 6—6 of Figure 5.
Figure 7:
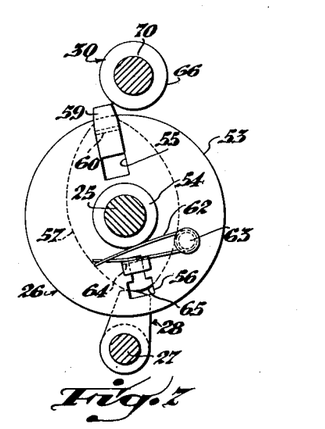
Figure 7 is a cross sectional view taken on the line 7—7 of Figure 6 illustrating in particular the side of the feed disc opposite to that one illustrated in Figure 5.

The grip roller assembly 30 includes two treads 66—66 which are designed to cooperate with the treads of the two discs 53—53 for feeding purposes, and to cooperate with the split aligning pins 59 for register purposes. The grip roller may be turned from a single piece of stock material to provide the shaft 37 at the end thereof to which gear 36 is pinned and to provide a stub shaft portion 67 at the opposite end thereof. The grip roller is journalled at its respective ends by bearing arm assemblies indicated generally at 68—68. The bearing arm assemblies respectively journal the shaft portion 37 at the one end and the stub shaft 67 at the opposite end of the grip roller. Just inwardly of the two bearing arm assemblies a sleeve or collar indicated at 69, in each instance, is rotatably journalled on the grip roller. In addition, the respective treads 66—66 are defined in the roller in each instance by a pair of grooves 70—70 which respectively are at the two sides of the tread 66 and which provide relief for the split aligning pins 59 so that they may embrace the sides of the tread 66 as shown in Figure 6.

The two collars or sleeves 69—69 which are journalled at the respective ends of the grip roller are provided to receive the roller lift cams 39 and 48. These two cams are mounted upon the shaft 25 so that they engage the two collars 69—69 at the time the respective aligning pins move into final form registry position. The two cams 39 and 48 are identical and each includes a raised lobe 71 which makes the actual contact to lift the grip roller.

Figure 4:
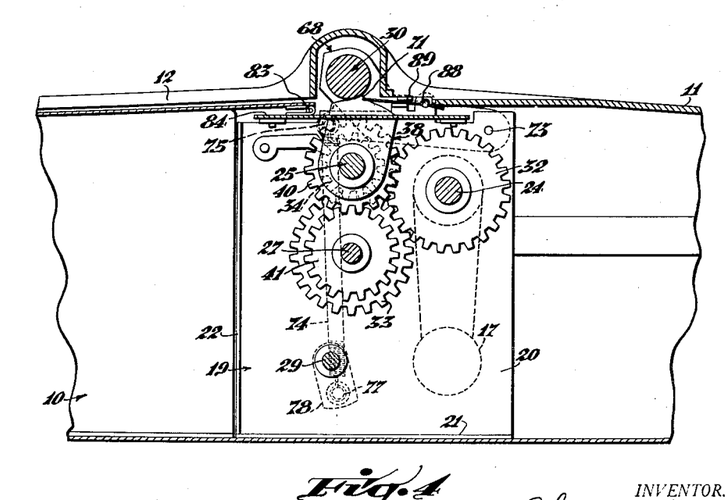
Figure 4 is a cross sectional view taken on the line 4—4 of Figure 3.

Each of the bearing arm assemblies 68 which journals an end of the grip roller is pivotally mounted at the end thereof opposite the journal upon a chassis side plate on the shank of a large headed bolt 72, which traverses a smooth bore in the arm and threads into the plate. The point of the pivot of the bearing arm is indicated at 73 in Figure 4 and it is above and toward the discharge end of the register with respect to the drive shaft 24. A pair of coil springs 74 are provided to urge the grip roller downwardly into a position in which the treads 66—66 thereon are in rolling engagement with the two feed discs 53. The upper end of each coil spring is pinned to the bearing arm as at 75. The lower end of each spring is not fixed, however. At the side of the machine opposite the crank, spring 74 is pinned as at 76 to a gear not shown. At the crank side of the machine, the spring is pinned as at 77 to a crank arm 78. The crank consists of a sleeve portion 79 which is journalled in an aperture in the chassis side plate (and which is pinned to the shaft 29) and the crank arm portion which may be brazed to or formed as part of the sleeve portion 79 to extend radially therefrom. In the position of the two pins 76—77 shown in Figures 3 and 4, the two coil springs 74—74 are under tension. The shaft 29 is adapted to be rotated through more than 180° from the position shown in these figures to move the two pins 76—76 into an overcenter, elevated position in which the two coil springs are under compression. Under these conditions, the two springs elevate the grip roller, the purpose being to facilitate the preparation of the machine for operation upon the forms. The raising of the roller is accomplished by means of a manual lift device which is indicated generally at 80. This manual lift device, including its relationship to the two coil springs etc. is the subject of a copending application Serial No. 404,547, filed January 18, 1954, and is thus not discussed in further detail here.

Figure 2:
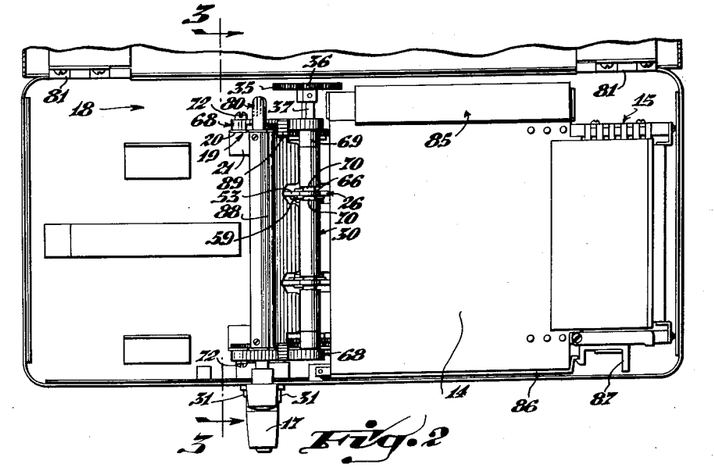
Figure 2 is a top plan view of the register of Figure 1 in which the cover is open, a portion only of the cover being shown.

In order to prepare the autographic register for operation, the cover or lid 11 is swung open as shown in Figure 2. Hinges such as those shown in 81 connect the lower portion of the register to the lid. The hinges are disposed at the side of the register opposite to the crank handle. From Figure 3 it will be noted that the crank shaft 24 is above the lower portion of the casing, and the left side of the lid, therefore, is sloted to accommodate the hub of the hand crank 17. A key operated latch, placed at 82 for example, may be provided to lock the cover in closed position. The one piece lid has the advantage that when it is swung open, both the record storage compartment and the entire writing platen 14 plus the strip separator assembly 15 are exposed. The writing platen is hinged as at 83 to a plate 84, the plate being secured to and extending between the respective side walls 20—20 of the chassis which mounts the feeding and aligning mechanism. The plate 84 is slotted in the conventional manner to accommodate the feed discs and the grip roller lift cams. The hinge 83 extends across plate 84 adjacent to and parallel with the grip roller so that when the writing platen is lifted the entire storage compartment for unused forms is exposed to view.

In preparing the register, a packet of new forms is placed in the storage compartment beneath the writing platen and the platen swung down to the position shown in Figure 2. The strips of forms of the stationery are then engaged in the slots provided between the separator bars of assembly 15. At the same time, sheets of carbon paper which may be enclosed within the case, indicated generally at 85, at the right side of the writing platen are interleaved with the strips of forms. The free ends of the carbons are gripped at the left side of the writing platen by the tear-off bar 86, the bar being held in place by a slidable latch such as the one shown at 87. The lowermost one of the forms is threaded underneath a pivotally mounted guide plate 88 which is disposed adjacent to the discharge slot 16.

The guide plate is pivotally mounted for floating rocking motion around an axis which extends across the register parallel with the grip roller and is limited in its upward motion by a pair of tabs 89, the individual tabs of the pair extending inwardly from the respective bearing arm assemblies 68—68 to overhang the ends of the plate. After the lowermost form is in place, the guide plate may be permitted to swing down from the position shown in Figure 4 to rest on top of the lowermost form. The others are simply laid on top of the guide plate so that they ride on it through slot 16 to be discharged on top of the cover of the register. The limited pivotal, floating movement provided for the guide plate 88 has the additional function of preventing the leading edge of the plate from becoming fouled on the transverse lines of perforations in the forms during discharge.

In order to permit the apertures in the superimposed forms of the strips to be engaged over the aligning pins, the manual lift device is operated to raise the grip roll assembly 30. With the apertures thus engaged, the manual lift device may be depressed causing the coil springs 74 to pull the tread portions 66—66 of the grip roll into engagement with the feed discs. The lid may then be closed and the register is in condition for operation.

*Operation*

Reference is now made to the diagrammatic views of Figures 5–13. At the start of the crank cycle, the aligning pin cams 28 are in contact with the respective cam surfaces 65 on the undersides of the aligning pin plates 57 so that the aligning pins are engaged in the apertures in the forms. As will be seen in Figure 5, the direction of rotation of the feed discs is opposite to that of the aligning pin cams so that contact is maintained between the two during the first ten to fifteen degrees of crank motion. However, as soon as the crank has been turned sufficiently far to move the cam surfaces 65 on the bottom of the aligning pin plates 57 from the aligning pin cams 28—28, the plate 57 is free to move under the action of the hairpin spring 62 to retract or withdraw the aligning pins. The pins are shown in retracted position in Figure 10. From this point in the rotation of the crank, the aligning pins remain retracted until near the end of the crank cycle, at which time the aligning pin cams again engage the respective cam surfaces 65. At any time in the cycle before the cams again engage, the forward motion of the forms may be broken by the apertures in the oncoming set of forms. That is, the stopping of the feed motion is independent of the positions of the aligning pins. Thus, forms as short as one to two inches may be handled in the machine, if desired.

Figures 13, 14:
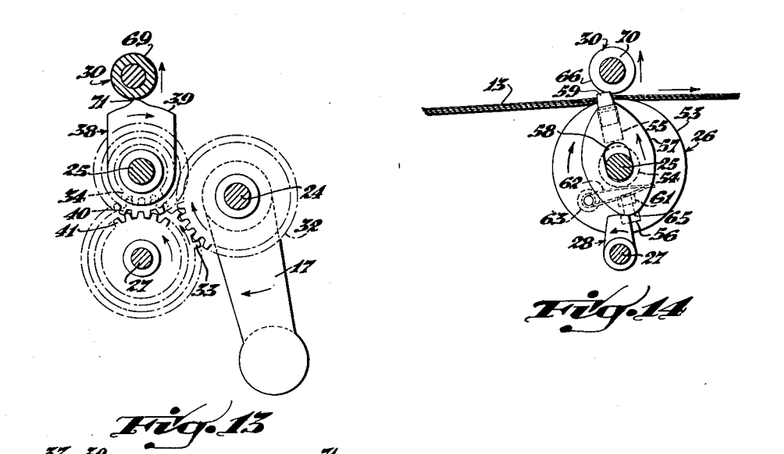
Figure 13 is a view similar to Figure 11 in which the crank is approaching the end of a revolution.
Figure 14 is a view similar to Figure 12 illustrating the positions of the various parts of the feeding and aligning mechanism when the crank is in the position shown in Figure 13.

With the treads 66—66 on the guide roller in rolling contact in the feed discs through the apertures, the forms remain stationary until, near the completion of the cycle, the aligning pins are lifted by the cams 28 to engage in the apertures. This action is shown in Figure 14. At the time that the aligning pins enter the apertures, the grip roller 30 is lifted by the cam lobes 71. This frees the forms so that they may be pulled forward into accurate registry with one another by the aligning pins.

It will be noted, from a comparison of Figures 13 and 14, which show respectively the positions of the cam lobes and aligning pins at the same point in the crank cycle, that the cam lobes move out from under the grip roller when the aligning pins are in their final position. This permits the grip roller to move down under the action of the coil spring 74 to securely grip the forms and prevent them from shifting relative to one another when the operator of the machine is writing upon them. The pins at this time are slightly ahead of center (see Figure 5) so that the apertures in the forms are past the treads 66—66 and the feed discs.

In the embodiment shown, the feed disc assemblies 26—26 make two revolutions for each revolution of the actuator shaft 27 upon which the aligning pin cams are mounted. This is the result, of course, of the two to one ratio between gears 34 and 33. Obviously, the ratio may be made three to one or more if desired. Increasing the ratio above two to one makes it possible to feed even longer forms through the machine without increasing the size of the feed discs.

It is preferred that all of the gears in the gear train from the hand crank through the actuator and feed disc shafts to the grip roll be made of nylon. Such gears, it is found, are both silent and require no lubrication.

Having described my invention, I claim:

1. In an autographic register, feeding and aligning means comprising a grip roller, a feed disc shaft mounted for rotation about an axis which is in spaced parallel relation to said grip roller, feed discs journalled on said feed disc shaft, spring means urging said grip roller into rolling contact with said feed discs, an aligning pin slidably mounted upon each of said feed discs, each aligning pin being movable radially of the disc upon which it is mounted between a retracted position in which said pin is disposed inwardly of the periphery of the disc and an extended position in which said pin is disposed outwardly of said periphery, spring means urging said pins toward their retracted positions, a cam shaft mounted for rotation about an axis which is in spaced parallel relation to said feed disc shaft, gear means interconnecting said cam shaft and said feed disc shaft such that the cam shaft makes one revolution for each two revolutions of the said disc shaft, and cam means mounted upon said cam shaft adapted to extend said pins at the completion of two revolutions of said feed disc shaft.

2. In an autographic register, feeding and aligning means comprising a grip roller, a feed disc shaft mounted for rotation about an axis which is in spaced parallel relation to said grip roller, a feed disc journalled on said feed disc shaft, spring means urging said grip roller into engagement with said feed disc, an aligning pin slidably mounted upon said feed disc, said aligning pin being movable radially of said disc between a retracted position in which said pin is disposed inwardly of the periphery of said disc and an extended position in which said pin is disposed outwardly of said periphery, a cam shaft mounted for rotation about an axis which is in spaced parallel relation to said feed disc shaft, gear means interconnecting said cam shaft and said feed disc shaft so that said cam shaft makes one revolution for each two revolutions of the said disc shaft, and cam means mounted upon said cam shaft adapted to actuate said aligning pin to extend said pin only once in every two revolutions of said feed disc shaft.

3. In an autographic register, cyclically operating feeding and aligning means comprising a grip roller, a feed disc mounted for rotation about an axis which is in spaced parallel relation to said grip roller, means to rotate said feed disc twice during each cycle of operation, spring means urging said grip roller into rolling engagement with said feed disc, a carrier having an aligning pin thereon, said carrier being mounted upon a side of said feed disc and slidable radially thereof between a retracted position in which the pin thereon is disposed inwardly of the periphery of the disc and an extended position in which said pin is disposed outwardly of said periphery, spring means normally urging said carrier to said retracted position, cam means, and means to actuate said cam means to slide said carrier into its extended position only once during said cycle and then only near the completion of two revolutions of said feed disc.

4. In an autographic register feeding and aligning means comprising a grip roller having two treads thereon in spaced relationship, a feed disc shaft mounted for rotation about an axis which is in spaced parallel relation to said grip roller, two feed discs journalled on said feed disc shaft in the spaced relationship of said treads, spring means urging said roller into tread engaging position with respect to said feed discs, an aligning pin carrier slidably mounted upon each of the feed discs, each aligning pin carrier being movable radially of the disc upon which it is mounted between a retracted position in which the pin thereon is disposed inwardly of the periphery of the disc and an extended position in which said pin is disposed outwardly of said periphery, a cam shaft mounted for rotation about an axis which is in spaced parallel relation to said feed disc shaft, gear means interconnecting said cam shaft and said feed disc shaft such that the cam shaft makes one revolution for each two revolutions of the said disc shaft, and cam means mounted upon said cam shaft adapted to engage the aligning pin carriers to extend said pins once in two revolutions of said feed discs and then only at the time said pins are adjacent to said treads.

5. In an autographic register, feeding and aligning means comprising a rotatable grip roller having at least one tread portion thereon, a feed disc shaft mounted below said grip roller for rotation about an axis which is in spaced parallel relation to the axis of said grip roller, at least one feed disc journalled on said feed disc shaft, means urging said grip roller downwardly to bring the tread portion thereon into rolling engagement with the periphery of said feed disc, an aligning pin plate mounted at the side of said feed disc, an aligning pin at one end of said plate, said plate being mounted for sliding movement radially of said disc between a retracted position in which the pin thereon is inwardly of the periphery of the disc and an extended position in which said pin is outwardly of said periphery, a horizontally disposed cam shaft mounted beneath said feed disc shaft for rotation about an axis which is in spaced parallel relation to said feed disc shaft, gear means interconnecting said cam shaft and said feed disc shaft so that said cam shaft makes one revolution for each two revolutions of said feed disc shaft, and cam means mounted upon said cam shaft adapted to engage the end of the aligning pin plate opposite the pin end thereof to extend said pin only once in each two revolutions of said feed discs and then only at the time said pin is adjacent to said grip roller.

6. In an autographic register adapted to operate upon manifolding stationery having aligning apertures therein, feeding and aligning means adapted to deliver successively sets of the forms of said stationery onto a writing platen, align said sets on said platen and then hold the forms of the sets in registry, said means comprising a horizontally disposed rotatable grip roller having tread portions thereon, a rotatable feed disc shaft mounted below the grip roller for rotation about an axis which is in spaced parallel relation to said grip roller, feed discs journalled on said feed disc shaft, each disc being disposed respectively beneath a tread portion on the roller, spring means urging said grip roller downwardly to bring the tread portions thereon into rolling contact with the respective feed discs, an aligning pin slidably mounted on each of said feed discs, each aligning pin being movable radially of the disc upon which it is mounted between a retracted position in which said pin is disposed inwardly of the periphery of said disc and an extended position in which said aligning pin is disposed outwardly of said periphery, spring means urging said pins toward their retracted positions, a cam shaft mounted below said feed disc shaft in spaced parallel relation thereto, gear means interconnecting said feed disc shaft and said cam shaft such that said cam shaft makes one revolution for every two revolutions of the feed disc shaft, cam means carried by said cam shaft adapted to actuate said pins to extend them into aperture engaging positions only near the completion of two revolutions of said feed discs when said pins are adajacent to said grip roller, and means to lift the grip roller at the time said pins move into said aperture engaging positions, the latter named means being effective only until the completion of the two revolutions of the feed discs, whereby at the end of the two revolutions of the feed discs the grip roller may return to strip feeding relation with said feed discs.

7. In an autographic register adapted to operate upon manifolding stationery consisting of a continuous strip of sets of superimposed forms, each set of forms having apertures therein which are aligned transversely of the strip, strip feeding and aligning means adapted to deliver successively sets of the forms onto a writing platen, align said sets on said platen and then hold the forms of the sets in registry, said means comprising a horizontally disposed grip roller having tread portions thereon, said grip roller extending transversely of the register at the head end of the writing platen with the tread portions thereon adapted to engage the respective apertures in oncoming forms, a feed disc shaft mounted below the grip roller for rotation about an axis which is in spaced parallel relation to said grip roller, feed discs journalled on said feed disc shaft, said discs being disposed respectively beneath the tread portions on the roller, spring means urging said grip roller downwardly to bring the tread portions thereon into rolling contact with the respective feed discs, an aligning pin slidably mounted on each of said feed discs, each aligning pin being movable radially of the disc upon which it is mounted between a retracted position in which said pin is disposed inwardly of the periphery of said disc and an extended position in which said aligning pin is disposed outwardly of said periphery, spring means urging said pins toward their retracted positions, a cam shaft mounted below said feed disc shaft in spaced parallel relation thereto, gear means interconnecting said feed disc shaft and said cam shaft such that said cam shaft makes one revolution for every two revolutions of the feed disc shaft, cam means carried by said cam shaft adapted to actuate said pins only once in every two revolutions of the feed discs to extend said pins into aperture engaging positions when the apertures in the forms are disposed between the tread portions on the grip roller and the peripheries of the respective feed discs, and means to lift the grip roller whereby final alignment and advancement of the strips may be through the movement of the aligning pins alone, the latter named means being decommissioned after said aligning pins move into their final strip aligning position in which position the apertures in the strips are passed the tread portions on the grip roller, whereby the grip roller is free to move down into strip gripping relation with said feed discs.

8. In an autographic register of the type adapted to operate upon manifolding stationery having aligning apertures therein, feeding and aligning means comprising a grip roller, a pair of feed discs, two tread portions on said grip roller, means to urge said roller downwardly into a position in which the tread portions thereon are in stationery feeding engagement with said feed discs whereby manifolding stationery may be advanced by the rotation of the roller and discs to a position in which the aligning apertures in the stationery are disposed between the respective tread portions of the roller and the feed discs, an aligning pin slidably mounted at the side of each of said feed discs, said pins spring means urging each of the plates into retracted position in which said pin is inwardly of the periphery of said disc, cam means adapted to actuate said pins to extend said pins into positions in which they are outwardly of the peripheries of said discs, drive means interconnecting the respective discs and cam means such that the respective pins are actuated by said cam means to extend the pins to enter the apertures at the time the apertures are between the respective treads and discs, and means to raise the grip roller at the time the pins enter the respective apertures whereby the stationery is free to be pulled into an advanced, finally aligned position by the pins alone, the latter named means becoming ineffective upon arrival of the stationery at the finally aligned position.

9. In an autographic register of the type adapted to operate upon manifolding stationery consisting of superimposed strips of forms in which the respective forms have aligning apertures therein, said register having stationery feed means comprising a grip roller and a pair of feed discs, the improvement comprising an aligning pin mounted upon each of said discs for sliding movement radially thereof between a position in which said pin is retracted with respect to the periphery of said disc and a position in which said pin is extended with respect to said periphery, rotatable cam means adapted to extend said pins, cyclically operating drive means interconnecting the grip roller, the discs and the cam means, said drive means adapted to rotate the feed discs at least twice in one cycle of operation and to rotate the cam means only once in said cycle, and said cam means and discs being related so that the cam means move into pin extending positions only at the end of one cycle of operation when said pins are adjacent to said grip roller.

10. In an autographic register of the type adapted to operate upon manifolding stationery consisting of superimposed strips of forms in which the respective forms have aligning apertures therein, said register having stationery feed means comprising a grip roller and a pair of feed discs, the improvement comprising a pair of aligning pins, each pin of the pair being mounted upon a disc for sliding movement radially thereof between a position in which the pin is retracted with respect to the periphery of said disc and an aperture engaging position in which said pin is extended with respect to said periphery, means adapted to extend said pins, and cyclically operated drive means interconnecting the grip roller, the discs and the latter named means, said drive means being effective to rotate the feed discs twice in each cycle of operation and actuate the latter named means to extend said pins only once in said cycle of operation.

11. In an autographic register adapted to operate upon manifolding stationery, the combination of a grip roller, a feed disc, an aligning pin slidably mounted upon said feed disc, spring means normally urging said pin into a retracted position with respect to the periphery of the feed disc, a rotatable cam adapted to effect the extension of said pin outwardly beyond the periphery of said feed disc into stationery aligning position, and cyclically operating drive means interconnecting the grip roller, the disc and the rotatable cam, said cyclically operating drive means being effective to actuate the cam to extend said pin only once during two revolutions of said feed disc and then only at a time in the cycle of operation near the end thereof, whereby the feed disc and grip roller may operate to advance the forms through more than one revolution of the feed disc.

12. In an autographic register adapted to operate upon manifolding stationery consisting of a continuous strip of sets of superimposed forms, each set of forms having a pair of apertures therein which are aligned transversely of the strip, strip feeding and aligning means comprising a horizontally disposed grip roller having a pair of tread portions thereon, said grip roller extending transversely of the writing platen of the register with the tread portions of the roller spaced to engage the respective apertures in a set of forms disposed on the writing platen, a feed disc shaft mounted below the grip roller for rotation about an axis which is in spaced parallel relation to said grip roller, a pair of feed discs on said feed disc shaft, each disc of the pair being disposed respectively beneath a tread portion of the grip roller, spring means biasing said grip roller downwardly to urge the tread portions thereon into contact with the peripheries of the respective feed discs, whereby a strip of manifolding stationery interposed between the grip roller and the discs is advanced upon the rotation of the roller and discs to a point where the treads on the grip roller contact the discs through the apertures in the forms to stop the advance of the strip, an aligning pin slidably mounted on each of said feed discs, each aligning pin being movable radially of the disc upon which it is mounted between a retracted position in which said pin is disposed inwardly of the periphery of said disc and an extended position in which said aligning pin extends outwardly beyond the periphery of said disc, spring means urging said pins toward their retracted positions, a cam shaft mounted below said feed disc shaft in spaced parallel relation thereto, gear means interconnecting said feed disc shaft and said cam shaft such that said cam shaft makes one revolution for two revolutions of the feed disc shaft, cam means carried by said cam shaft adapted to actuate said pins once in two revolutions of the feed disc to extend said pins into aperture engaging positions when the apertures in the forms are disposed so as to permit the tread portions on the grip roller to make contact with the respective feed discs, means effective to lift the grip roller when the pins move into aperture engaging positions, whereby the strips are free of the grip roller and are adapted to be advanced into a final position of registry by the aligning pins, the latter named means becoming ineffective when said aligning pins reach said final position of registry in which position the apertures in the strip are passed the tread portions on the grip roller, whereby the grip roller may return into strip gripping relation with said feed discs to clamp the strip between the tread portions thereon and the peripheries of said feed discs and to hold said strip in condition to be advanced in the succeeding strip feeding operation.

13. In an autographic register of the type adapted to operate upon manifolding stationery forms having aligning apertures therein, feeding and aligning means comprising a grip roller, a feed disc, means to urge said grip roller into rolling contact with said feed disc whereby manifolding stationery forms interposed between the roller and disc may be advanced by the rotation of the roller and the disc to a position in which an aligning aperture in the forms is disposed between the roller and the disc, an aligning pin on said disc, means normally urging said pin into a retracted position in which said pin is inwardly of the periphery of said disc, a pin actuator adapted to extend said pin into an aperture engaging position in which it extends radially outwardly beyond the periphery of said disc, drive means interconnecting the disc and said pin actuator such that the pin actuator becomes effective to extend the pin only once in two revolutions of the disc, whereby stationery forms which are longer than the circumference of the disc may be advanced without interference by the pin, and means to disengage the grip roller during the time the extended pin is engaged in an aperture, whereby the stationery is free to be pulled into an advanced, finally aligned position by the pin alone.

References Cited in the file of this patent

UNITED STATES PATENTS

| 1,431,266 | Sherman | Oct. 10, 1922 |
| 1,651,456 | Jensen | Dec. 6, 1927 |